Jan. 9, 1923.
T. F. CARROLL.
CONNECTOR FOR TIRE CHAINS.
FILED JULY 10, 1922.
1,441,483
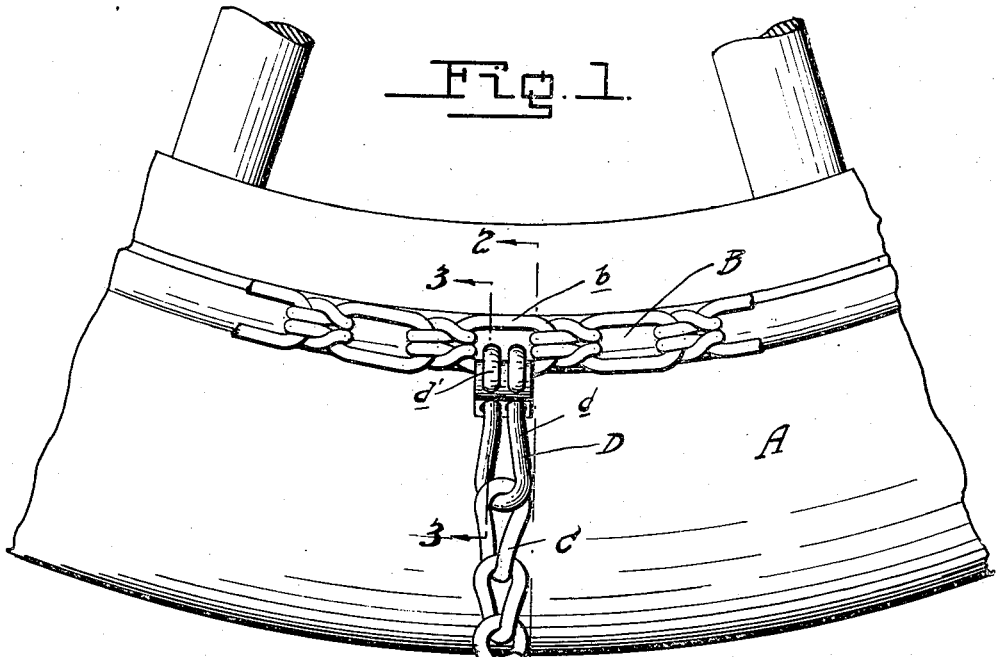
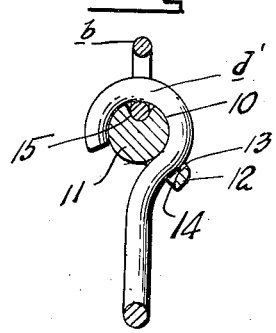
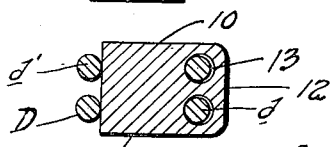
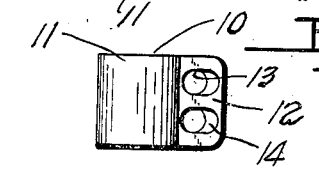
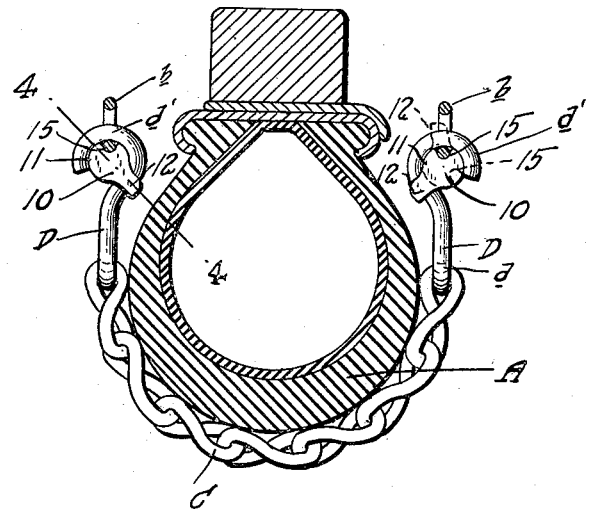
Inventor
Thomas F. Carroll
By Frederic B. Wright
Attorney Patented Jan. 9, 1923.

1,441,483

UNITED STATES PATENT OFFICE.

THOMAS F. CARROLL, OF GREENWICH, CONNECTICUT.

CONNECTOR FOR TIRE CHAINS.

Application filed July 10, 1922. Serial No. 573,833.

*To all whom it may concern:*

Be it known that I, THOMAS F. CARROLL, a citizen of the United States, residing at Greenwich, in the county of Fairfield, and State of Connecticut, have invented certain new and useful Improvements in Connectors for Tire Chains, of which the following is a specification.

This invention relates to link connections, and particularly to the means for connecting the cross links of a tire chain with the longitudinal links thereof.

Ordinarily each cross chain of a tire chain or non-skid chain is provided with a double hook which engages a link of the corresponding longitudinal chain. This double hook, after it is engaged with the longitudinal link, is forced by suitable tools into more or less tight engagement with the link so that it cannot slip off the link, and if one of the transverse chains becomes broken or otherwise damaged, the tire chain as a whole has to be taken to a repair man, who opens the hooks on the ends of the terminal links and removes the broken chain and replaces it with a new chain. This cannot be satisfactorily done except with proper tools, and if such a break occurs on the road the driver of the car is helpless and must either take the chain off or else the broken cross chain will strike against the mudguards of the machine or other projecting parts with consequent liability to breakage and damage.

One of the objects of the present invention is to provide means for positively locking the terminal links of the transverse chains to the longitudinal chains of an anti-skidding device, this means being so constructed that it may be readily applied to the terminal links, and particularly so constructed that the transverse chain may be readily connected with the longitudinal chains and then locked from accidental detachment, the lock being such, however, as to prevent the transverse chain at any time from being disconnected from the longitudinal chains but permit the easy disconnection of the transverse chains from the longitudinal chains if desired.

A further object is to provide a locking device which may be applied to the ordinary hook-shaped terminal link of these transverse chains without in any way altering the construction of this terminal link or the construction of the anti-skidding chain as a whole.

A still further object is to provide a device of this character which is of such form that it may be cast in groups and annealed in bulk without requiring any finishing operation, without requiring inspection, and without liability of breakage, and that when once applied to the terminal hooks of the transverse chains they cannot get out of place or shift from locking position.

Other objects will appear in the course of the following description.

My invention is illustrated in the accompanying drawings, wherein:—

Figure 1 is a side elevation of a portion of a pneumatic tire with a fragment of an anti-skid chain applied thereto and showing my improved fastening device applied to the terminal hook of the chain;

Figure 2 is a section on the line 2—2 of Figure 1;

Figure 3 is an enlarged section on the line 3—3 of Figure 1;

Figure 4 is a section on the line 4—4 of Figure 2;

Figure 5 is a plan view of my locking device.

It will be seen that in Figure 1, I have illustrated a pneumatic tire A having the usual "Weed chain" or anti-skid chain applied thereto, this anti-skid chain consisting of a series of longitudinal links B and transverse chains C, the links of which are twisted in the usual manner. In Weed chains and chains of like character, the transverse links C are connected to the longitudinal links B by terminal hooks D. These hooks are formed of a single wire bent at its middle to provide two arms $d$, each arm being bent to form a hook $d'$, which double hook embraces the longitudinal bar of a link $b$. These hooks ordinarily are forced down upon the longitudinal bar of the link $b$ by means of suitable tools and cannot be released from engagement with the link $b$ except by the use of suitable tools and by an expert workman.

As before stated, one of the objects of my invention is to provide a device which will do away with the necessity of closing the hooks $d'$ upon the link $b$ by means of tools and permit the ready detachment of the chain C from the chain B. My locking device for this purpose comprises a small casting 10 which, as illustrated in Figure 5, is formed to provide a more or less cylindrical barrel 11 having a radially extending portion 12.

The barrel 11 is adapted to fit closely within the hook $d'$ and to rotate within this hook. The radial portion 12 is formed with two parallel openings 13 through which the bills of the hooks $d'$ may pass, these openings 13 extending circumferentially of the barrel and being slightly flared, as at 14. The barrel is, of course, somewhat longer than the distance between the outside faces of the arms $d$ and hooks $d'$ of link D. At one point the barrel is formed with a longitudinally extending groove 15 and this groove is adapted to receive one of the longitudinal bars of the link $b$, as illustrated in Figure 2.

In use, the hooks $d'$ of the hook-shaped link D are inserted through the openings 13. The barrel 11 is disposed within the bight of the hooks $d'$. Thus the barrel is mounted within these hooks for oscillation from the position shown in full lines in Figure 2 to the position shown in dotted lines in this figure. After the device is applied to the hooks, the hooks are bent down so as to fit closely around the barrel and prevent the removal of the barrel through the space between the extremities of the hooks and the arms $d$. I do not wish to limit myself to this, however, as it is possible to first form the terminal member D with more or less straight arms, thread them through the openings 13, and then bend the arms into a hook around the barrel. In either case the barrel is mounted for oscillation within the bight of the hooks $d'$ and when it is desired to connect the link $b$ with the chain C, the locking device 10 is turned so that the groove 15 will receive the link $b$ and then is reversely turned to the position shown in full lines in Figure 3, carrying the link $b$ away from the terminal ends of the hooks $d'$. It will be seen from Figure 2 that under these circumstances no pressure is exerted upon the locking devices or any strain exerted upon the locking devices which will tend to shift the locking devices to a position where they will cause the detachment of the links $b$ from the hooks $d$. As a matter of fact, no strain comes upon the locking devices 10, nor can any force be exerted on these locking devices in actual operation which would tend to force them from the position shown in full lines in Figure 3 to the position shown in dotted lines in Figure 2.

With this device, coupling of the transverse chains C with the circumferential chains B may be made at any time by any one at will and without tools. One of the essentials of devices of this kind is that they may be cheaply made and easily applied, and the lock disclosed may obviously be made in the same manner that harness trimmings, buckles and like small articles are made, that is these devices may be cast in groups of twenty or more pieces and annealed in bulk so as to render the otherwise brittle metal malleable. This is secured by getting the molds together so that a single pour will fill many patterns at once.

It will be seen that this locking device is of one piece so that there is a maximum strength that will stand any strain which the chain as a whole will stand. There are no parts which are liable to be broken and, therefore, the locking device can be used over and over again with new links. When the locking device is in place upon the terminal links B or hooks, it holds the hook in such a way that if the chain should strike the side of a curb the hooks will not be bent, as the central core or barrel holds the hooks from tightening or from bending sidewise. Furthermore, the construction is such that even though the tire should strike the side of a curb or any other object it will not come undone. Furthermore, the locking device helps to reinforce the top of the cross link $b$ and hold this cross link from any deflection or deformation.

While I have illustrated my device and particularly designed the device as applied to connecting the cross chains of a tire chain with the circumferential chains thereof, I do not wish to be limited to this use, as it is obvious that it may be used in many other circumstances as a detachable shackle.

I claim:—

1. As an article of manufacture, a lock for chain connections comprising a cylindrical barrel having a longitudinally extending link receiving groove upon its surface, the barrel having a portion extending radially outward beyond the surface of the barrel, said radially extending portion being circumferentially spaced from said groove and apertured for the passage of a hook shank.

2. As an article of manufacture, a lock for chain connections comprising a cylindrical barrel having a longitudinally extending, link-receiving groove upon its surface, the barrel having a radially extending portion formed with parallel, link-receiving apertures, each defined by a surrounding wall.

3. The combination with a chain connection having a pair of parallel hooks formed with approximately parallel shanks, of a lock comprising a cylindrical barrel disposed within the bights of the hooks and having a longitudinally extending link receiving groove upon its surface, the barrel having a portion projecting radially beyond the surface of the barrel and circumferentially spaced from said groove, the radial portion being apertured for the passage of the shanks of said hook.

4. The combination with a chain connection comprising a U-shaped link having opposed, parallel arms formed at their terminal ends to provide substantially parallel hooks, of a link-engaging lock comprising a cylindrical barrel disposed within the bights of the hooks and rotatable therein and having a radial portion spaced from said groove and having a pair of apertures through which the hooks loosely pass each of said apertures being defined by a surrounding wall.

5. The combination with the cross chain of an anti-skid device and the longitudinal chains thereof, the cross chain having at its extremities U-shaped terminal members formed at their ends to provide parallel hooks adapted to engage the links of the circumferential chains, of a locking device for said cross chains comprising a member formed to provide a barrel disposed within the bights of the hooks, the barrel having a longitudinally extending groove upon its surface adapted to align with the space between the bills of the hooks and the bodies of the hooks and the barrel having a substantially radial portion formed with apertures through which said hooks pass, said apertures being each defined by a surrounding wall, the barrel being thereby oscillatably mounted upon the hooks to permit the insertion of a link of the circumferential chain within the groove of the barrel and the rotation of the barrel to a position holding the link within the hooks.

In testimony whereof I affix my signature.

THOMAS F. CARROLL.